(12) United States Patent
McCoy et al.

(10) Patent No.: US 8,430,418 B2
(45) Date of Patent: Apr. 30, 2013

(54) FIFTH WHEEL HITCH

(75) Inventors: Richard W. McCoy, Granger, IN (US); William Aske, Bristol, IN (US)

(73) Assignee: Cequent Performance Products, Inc., Plymouth, MI (US)

( * ) Notice: Subject to any disclaimer, the term of this patent is extended or adjusted under 35 U.S.C. 154(b) by 293 days.

(21) Appl. No.: 12/580,797

(22) Filed: Oct. 16, 2009
(Under 37 CFR 1.47)

(65) Prior Publication Data
US 2010/0237587 A1    Sep. 23, 2010

Related U.S. Application Data

(60) Provisional application No. 61/196,311, filed on Oct. 16, 2008.

(51) Int. Cl.
*B62D 53/08* (2006.01)
(52) U.S. Cl.
USPC .................. 280/438.1; 280/416.1; 280/416.3; 280/417.1
(58) Field of Classification Search .................. 280/433, 280/438.1, 416.1, 416.3, 417.1
See application file for complete search history.

(56) References Cited

U.S. PATENT DOCUMENTS

| | | | |
|---|---|---|---|
| 195,025 A * | 9/1877 | Lane .............................. 213/182 |
| 2,353,267 A | 7/1944 | Reid |
| 2,874,976 A * | 2/1959 | Linn .............................. 280/512 |
| 2,925,286 A | 2/1960 | Hodges, Jr. et al. |
| 3,993,325 A * | 11/1976 | Gravett ....................... 280/418.1 |
| 4,183,548 A | 1/1980 | Schneckloth |
| 5,016,898 A * | 5/1991 | Works et al. ................... 280/433 |
| 5,328,198 A | 7/1994 | Adams |
| 5,344,172 A | 9/1994 | Jaun |
| 5,356,167 A * | 10/1994 | Hall et al. ..................... 280/492 |
| 5,513,869 A | 5/1996 | Putnam |
| 5,964,476 A | 10/1999 | Maines |
| 6,050,588 A * | 4/2000 | Kissack ........................ 280/511 |
| 6,135,482 A * | 10/2000 | Larkin ....................... 280/416.1 |
| 6,158,761 A * | 12/2000 | King ............................. 280/495 |
| 6,170,850 B1 | 1/2001 | Works |
| 6,199,890 B1 * | 3/2001 | Lindenman et al. ....... 280/491.1 |
| 6,416,073 B1 | 7/2002 | Marcy |
| 6,485,045 B1 | 11/2002 | King |
| 6,581,951 B2 | 6/2003 | Lange |
| 6,776,431 B1 | 8/2004 | Dick |
| 6,969,090 B1 * | 11/2005 | Works .......................... 280/407 |
| 6,971,660 B1 | 12/2005 | Putnam |
| 6,986,524 B2 | 1/2006 | Heitzmann |
| 7,100,935 B1 * | 9/2006 | Dunbar ........................ 280/433 |
| 7,192,045 B2 | 3/2007 | Gurtler |

(Continued)

*Primary Examiner* — James Kramer
*Assistant Examiner* — Maurice Williams
(74) *Attorney, Agent, or Firm* — McDonald Hopkins LLC

(57) ABSTRACT

The present application describes apparatus for attaching or securing a fifth wheel hitch to a bed of a towing vehicle. The fifth wheel hitch may be arranged to be secured to a hitch ball, such as a gooseneck hitch ball. The fifth wheel hitch may include a chamber for accepting a hitch ball, a locking pin for securing the hitch ball in the chamber, and a handle for selectively securing and releasing the hitch ball. The locking pin may be biased towards a position for securing the hitch ball in the chamber. A damper may be included to dampen impact forces transferred from the trailer to the towing vehicle through the fifth wheel hitch. The fifth wheel hitch may include support members having wear strips that may rest on the surface of the towing vehicle bed.

18 Claims, 3 Drawing Sheets

U.S. PATENT DOCUMENTS

| | | |
|---|---|---|
| 7,562,892 B2 | 7/2009 | Schwalbe |
| 7,673,895 B1 * | 3/2010 | Hesse et al. ................ 280/417.1 |
| 7,753,391 B1 * | 7/2010 | Hesse et al. .................. 280/439 |
| 2004/0113390 A1 | 6/2004 | Broussard, III |
| 2008/0066300 A1 * | 3/2008 | Alguera Gallego ............. 29/700 |
| 2009/0127822 A1 * | 5/2009 | Colibert et al. ............ 280/438.1 |

* cited by examiner

FIFTH WHEEL HITCH

CROSS-REFERENCE TO RELATED APPLICATION

This application claims benefit from U.S. Provisional Patent Application No. 61/196,311, entitled "Fifth Wheel Hitch," filed on Oct. 16, 2008, which is hereby incorporated in its entirety by reference.

FIELD OF INVENTION

The present invention relates generally to apparatus for securing equipment to the bed of a towing vehicle and, more particularly, to apparatus for securing a fifth wheel accessory to a hitch ball located in the bed of a towing vehicle.

BACKGROUND

The towing industry has developed a number of methods and apparatuses for securing a trailer to a towing vehicle. For example, hitch balls have been developed to be attached to the bumper or other rear portion of a towing vehicle. A trailer or towed vehicle equipped with a coupler mechanism may be attached to the towing vehicle by placing the coupling mechanism over the hitch ball and securing the coupler to the ball. Similar apparatus using hitch receivers attached to the rear of a towing vehicle and drawbars may be used to secure trailers to towing vehicles.

Some trailers are designed to carry heavy loads. However, connecting such a trailer to a ball hitch on a bumper of a towing vehicle may be impractical. When a trailer load is heavy as compared to the weight of the towing vehicle, applying the trailer load to the rear of the towing vehicle may cause unsafe towing conditions. In such situations, the trailer is often secured to a bed of a towing vehicle so that the force of the trailer load is generally applied over the rear axle of the towing vehicle to create more stable and safer towing conditions. In addition, such an arrangement puts much of the force of the trailer load onto structural members of the towing vehicle such as the frame.

There are generally two arrangements for securing a trailer to the bed of a towing vehicle—a fifth wheel hitch and a gooseneck hitch. A fifth wheel hitch is generally positioned in a bed of a truck and secured either to the bed or directly to the frame of the truck. Fifth wheel hitches are generally attached to the bed or frame in a permanent manner, i.e., tools are generally required to remove fasteners and other connectors to install or uninstall a fifth wheel hitch to the bed of a towing vehicle. Fifth wheel hitches commonly have jaws that are moveable to secure and release a king pin extending from a trailer. Gooseneck hitches generally attach to a hitch ball located in the bed of a towing vehicle. The hitch ball is typically permanently secured to the frame or bed of the towing vehicle.

Towing vehicles are generally arranged to accommodate either a fifth wheel hitch or a gooseneck hitch, but not both. To convert a towing vehicle from accommodating a fifth wheel hitch to a gooseneck hitch or vice versa is time and labor intensive and inefficient. Therefore, there is a need in the art for improved apparatus for towing vehicles that allow for selectively accommodating either a fifth wheel hitch or a gooseneck hitch.

SUMMARY

The present application describes apparatus for attaching or securing a fifth wheel hitch to a bed of a towing vehicle. The fifth wheel hitch includes a chamber for accepting a hitch ball, a locking pin for securing the hitch ball in the chamber, and a handle for selectively securing and releasing the hitch ball. The locking pin may be biased towards a position for securing the hitch ball in the chamber.

Disclosed herein is a fifth wheel hitch to be used with a towing vehicle. The fifth wheel hitch may be arranged to be secured to a hitch ball, such as a gooseneck hitch ball. The hitch ball may be secured in the bed of a towing vehicle. The hitch ball may be attached directly or indirectly to the frame of the towing vehicle and the hitch ball may be positioned to protrude from a hole or aperture in the bed of the towing vehicle. The hitch ball may be attached underneath or above the truck bed of the towing vehicle. The fifth wheel hitch may be arranged to be secured to hitch balls of a variety of shapes and sizes.

Damping material may be included in the fifth wheel hitch to dampen impact forces transferred from the trailer to the towing vehicle through the fifth wheel hitch. The fifth wheel hitch may include support members that rest on the surface of the towing vehicle bed. In such an arrangement, strips of material may be positioned between the support members and the bed to reduce or prevent damage to the bed due to contact with the fifth wheel hitch. The support members may be arranged to accept pins that pass through the support members and into the bed of the towing vehicles. In such an arrangement, the pins may resist or prevent rotation of the fifth wheel hitch relative to the bed of the towing vehicle.

BRIEF DESCRIPTION OF THE DRAWINGS

Objects and advantages together with the operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention.

Figure 1:
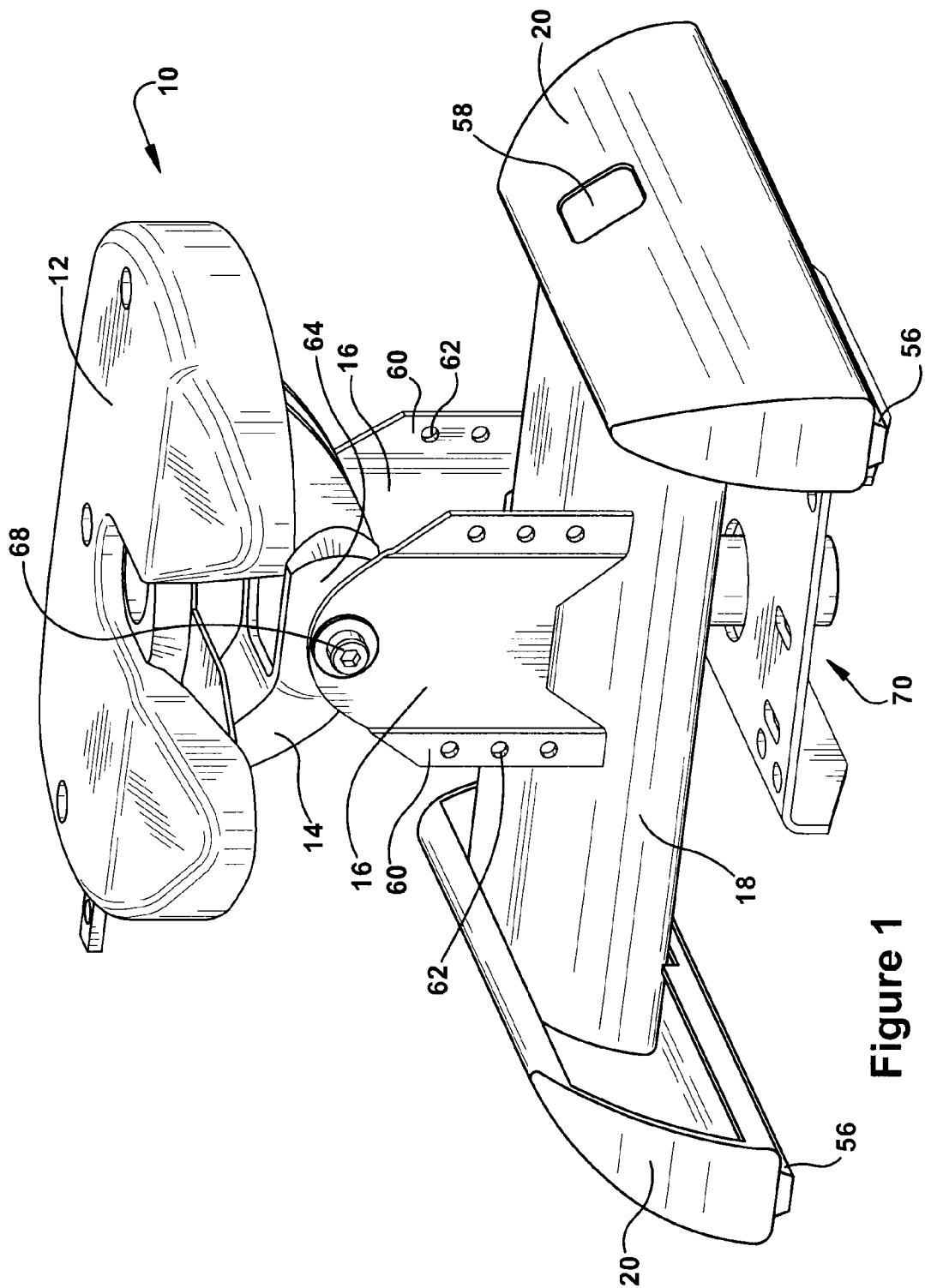
FIG. 1 illustrates a perspective view of a fifth wheel hitch in an embodiment of the invention.

A fifth wheel hitch 10 is illustrated in FIG. 1. The fifth wheel hitch 10 may include a head or fifth wheel head 12, a saddle casting 14, at least one adjustment plate 16, a cross channel 18, and at least one support leg 20. While the fifth wheel hitch 10 may be shown and described as having a pair of adjustment plates 16 and a pair of support legs 20, it is to be understood that the fifth wheel hitch 10 may have any appropriate number of plates 16 or support legs 20 and should not be limited to that shown and disclosed herein.

Figure 3:
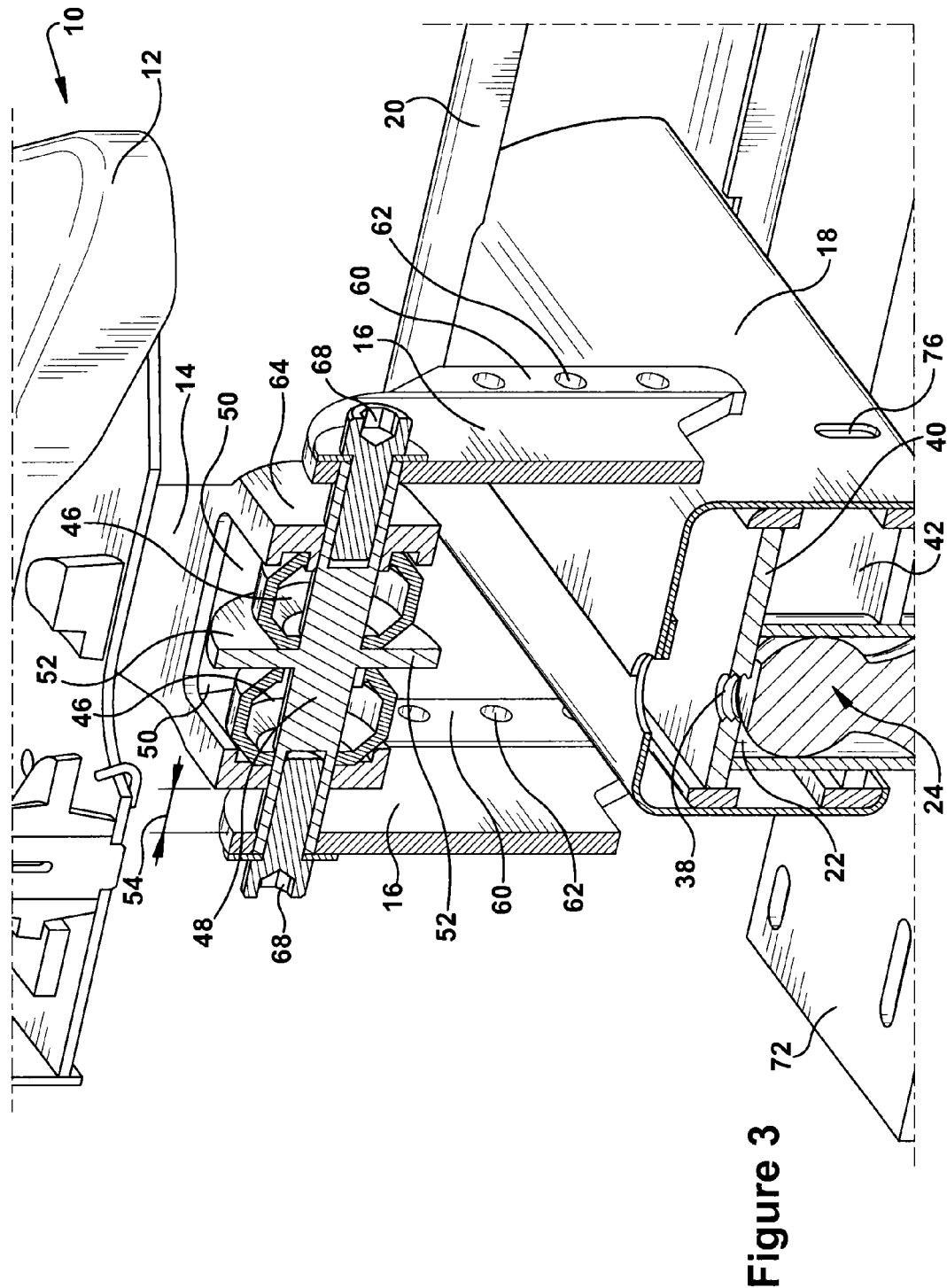
FIG. 3 illustrates a cross-sectional perspective view of an embodiment of a fifth wheel hitch secured to a hitch ball.

The saddle casting 14 may be of any appropriate shape or size, such as a general U-shape whereby it may have two ends (not shown) extending outwardly from a midpoint 64 (FIG. 1). The saddle casting 14 may be secured to the attachment plates 16. The saddle casting 14 may be secured by any appropriate means, such as with fasteners. The saddle casting 14 may be positioned or attached to the attachment plates 16 at any appropriate location, such as at an end opposite that of the cross channel 18. The adjustment plates 16 may be attached to the saddle casting 14 at any appropriate location, such as at the midpoint 64 on either side of the saddle casting 14. For example, each adjustment plate 16 may be attached at the midpoint 64 on either side of the saddle casting 14 (FIG. 3). In addition, the saddle casting 14 may be attached to the adjustment plates 16 at a point raised above where the adjustment plates 16 are attached to the cross channel 18.

The fifth wheel head 12 may be of any appropriate shape or size, such as that generally known in the art. The fifth wheel head 12 may be secured to the saddle casting 14. The head 12 may be secured to the saddle casting 14 by any appropriate means, such as with fasteners. The head 12 may be secured to the saddle casting 14 at any appropriate location on the saddle casting 14, such as at either end of the saddle casting 14 (FIG. 1). The saddle casting 14 may be arranged to offset the fifth wheel head 12 with respect to a ball hitch 24. The saddle casting 14 may be reversible to allow either a forward or rearward longitudinal offset.

The support legs 20 may be arranged to rest on a surface of a towing vehicle bed (not shown). The support legs 20 may be of any appropriate shape or size, such as a generally curved, rectangular, circular or triangular shape. The support legs 20 may positioned at any appropriate location relative to one another, such as generally spaced at a distance opposite one another. For example, the support legs 20 may be located at either end of the cross channel 18 (FIG. 1).

The cross channel 18 may be of any appropriate shape or size, such as generally rectangular, circular or tubular. The cross channel 18 may be one piece or may be one or more pieces attached together by any appropriate means, such as by fasteners, welding or the like. The cross channel 18 may connect the support legs 20 to form a base of the fifth wheel hitch 10. The cross channel 18 may be positioned and attached to the support legs 20 at any appropriate location on the support legs 20, such as generally in the center of each support legs 20 (FIG. 1). The cross channel 18 may be attached to the support legs 20 by any appropriate means, such as by fasteners, welding or the like.

The adjustment plates 16 may be arranged to be selectively secured to the cross channel 18. For example, the adjustment plates 16 may be located opposite one another and be positioned on either side of the cross channel 18 (FIG. 1). While the adjustment plates 16 are shown as being located opposite one another and on either side of the cross channel 18, it is to be understood that the adjustment plates 16 may be positioned at any appropriate location on the fifth wheel hitch 10 and should not be limited to that disclosed herein.

Each adjustment plate 16 may include at least one wing 60. Each adjustment plate 16 may include a wing 60 located on either side of the plate 16. In addition, each wing 60 may include at least one aperture 62. There may be any appropriate number of apertures, such as a series of apertures 62 located on each wing 60 and each wing 60 may have the same amount or a different number of apertures 62.

The adjustment plates 16 may be attached to the cross channel 18 by any appropriate means, such as by welding, fasteners or the like. The apertures 62 may permit the plates 16 to be attached to the cross channel 18 with fasteners (not shown) at any number of different positions, where such attachment may determine the height of the fifth wheel head 12 relative to the bed of the towing vehicle.

Each wing 60 of each adjustment plate 16 may include a series of three apertures 62 that may allow the height of the head 12 to be adjusted by three inches relative to the bed of the towing vehicle. Such an arrangement may add flexibility to the positioning of the fifth wheel head 12 so that the head 12 may accommodate a greater variety of king pins (not shown).

Figure 2:
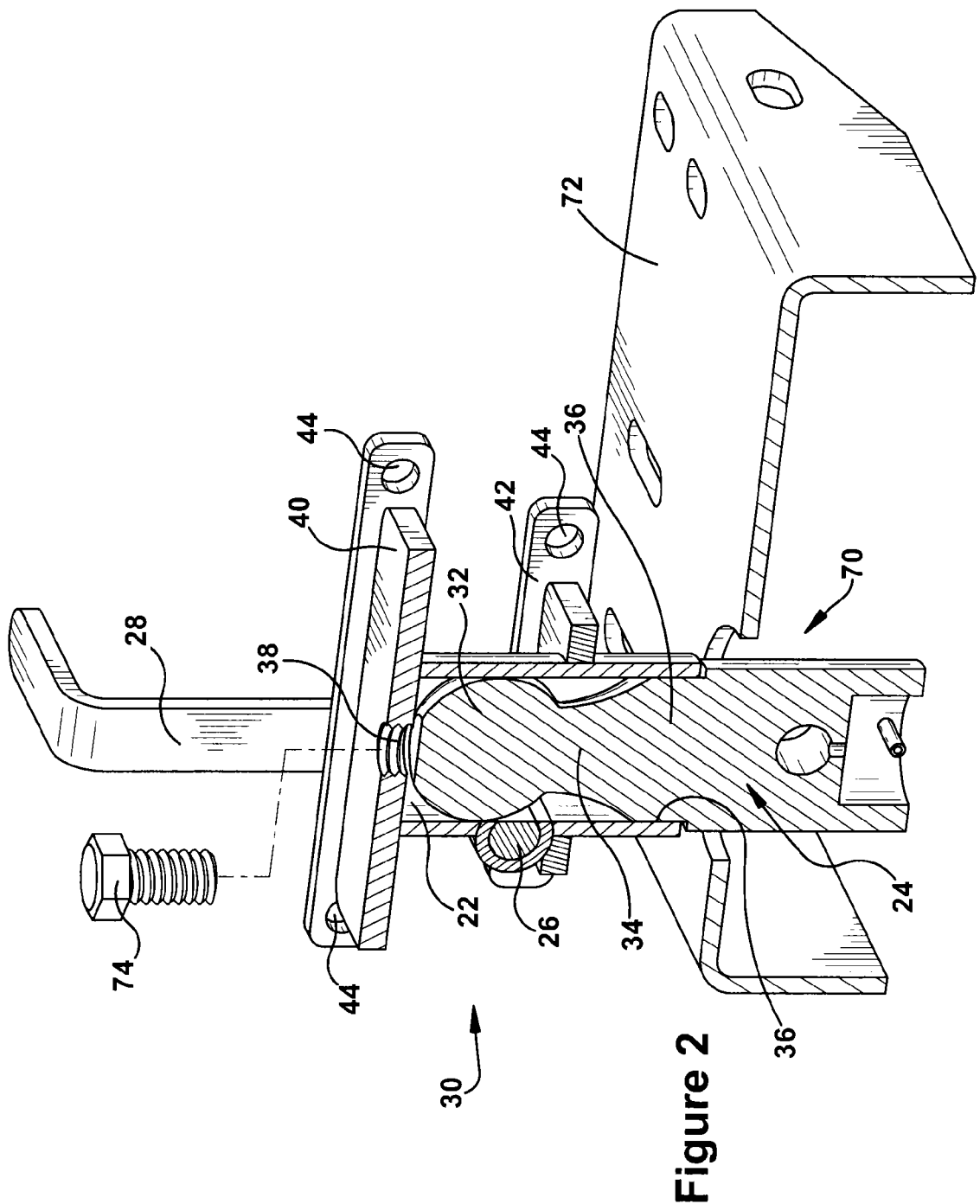
FIG. 2 illustrates a partial cross-sectional perspective view of a gooseneck hitch assembly and the fifth wheel hitch secured to a hitch ball.

The fifth wheel hitch 10 may be utilized with a gooseneck hitch assembly 70. The gooseneck hitch assembly 70 may include a gooseneck mount plate 72 and a hitch ball 24 (FIG. 2). The hitch ball 24 may include a ball portion 32, neck portion 34 and shoulder portion 36. The fifth wheel hitch 10 may also include a spring loaded ball coupler assembly 30 that may interact with the hitch ball 24. The ball coupler assembly 30 may be substantially located within the cross channel 18 (FIG. 3). For example, the fifth wheel hitch 10 may be placed over a gooseneck hitch ball 24 that may be secured to the bed of a towing vehicle. Specifically, the spring-loaded ball coupler 30 may be placed over the hitch ball 24 and the support legs 20 may be positioned on top of the bed of the towing vehicle.

The spring loaded coupler 30 may include a chamber 22, a locking pin 26, and a handle 28. The chamber 22 may be of any appropriate shape or size, such as a generally cylindrical shape that may be correspondingly sized to fit the hitch ball 24 (FIG. 2). For example, the internal chamber 22 may accommodate the hitch ball 24 attached to the towing vehicle. Once the hitch ball 24 is positioned within the chamber 22, the fifth wheel hitch 10 may be secured to the towing vehicle via the hitch ball 24. The locking pin 26 may be attached to the handle 28 by any appropriate means so that the ball locking pin 26 may rotate with the handle 28.

The coupler 30 may rigidly secure the fifth wheel hitch 10 to the hitch ball 24 and thereby the gooseneck hitch assembly 70. The coupler 30 may be placed over the gooseneck hitch ball 24. As the spring loaded coupler 30 is placed over the hitch ball 24, the coupler 30 may open, i.e., the locking pin 26 may be moved laterally to accommodate the ball portion 32 of the hitch ball 24 as the hitch ball 24 moves past the locking pin 26. When the fifth wheel hitch 10 is positioned to be secured to the hitch ball 24, the ball coupler 30 may come into contact with and be supported by the shoulder portion 36 of the ball hitch 24. Such a position may reduce relative movement between the ball coupler 30 and the hitch ball 24.

After the hitch ball 24 moves past the locking pin 26, a biasing member (not shown) may move the locking pin 26 back towards the hitch ball 24 whereby it may engage with the neck portion 34 of the hitch ball 24 to secure the fifth wheel hitch 10 to the hitch ball 24. Once the locking pin 26 is engaged with the neck portion 34 of the ball hitch 24, the handle 28 may be optionally secured to any appropriate structural member of the fifth wheel hitch 10 to further secure and maintain the fifth wheel hitch 10 to the hitch ball 24 and thus to the towing vehicle.

The handle 28 and the locking pin 26 may be coupled together so that movement of the handle 28 results in movement of the locking pin 26 and vice versa. The handle 28 may be secured in an unlatched position, as shown in FIG. 2, or in a latched position. The handle 28 may be placed in a latched position when the handle 28 is rotated from the vertical or unlatched position (FIG. 2) to a horizontal or latched position. It will be understood that when the handle 28 is in the unlatched position, the locking pin 26 may be spaced away from the hitch ball 24, and when the handle 28 is in the latched position, the locking pin 26 may be moved towards hitch ball 24 to engage and secure the hitch ball 24.

The handle 28 and locking pin 26 may be biased towards the engaged or latched position. The handle 28 and locking pin 26 may be biased by a biasing member (not shown). For example, a coil spring may be secured at a first end to the handle 28 and secured at a second end to any appropriate structural member of the fifth wheel hitch 10. In such an arrangement, the spring may be positioned so that when the handle 28 is moved to the unlatched position, the spring is extended from its natural position and applies a force on the handle 28 to encourage it back to the latched position.

The handle 28 may also serve as a lift handle for use in manually or mechanically positioning the fifth wheel hitch assembly 10 onto the hitch ball 24 or removing the fifth wheel hitch assembly 10 from the hitch ball 24. The handle 28 as positioned in FIG. 2 illustrates a position for using the handle 28 as a lift handle.

As seen in FIGS. 2 and 3, the ball coupler 30 may include a pair of brackets 40, 42. The brackets 40, 42 may be any appropriate shape or size, such as a shape appropriate to secure the coupler within the cross channel 18. For example, the brackets 40, 42 may include two side sections and a middle section that may connect the two sides (FIG. 3) that may be connected by any appropriate means. As another example, the brackets 40, 42 may be of a one piece construction. The brackets 40, 42 may be used in securing the ball coupler 30 to the cross channel 18. One of the brackets 42 may include a cut out portion to accommodate the chamber 22. The brackets 40, 42 may be housed within the cross channel 18.

The chamber 22 of the ball coupler 30 may be secured to the cross channel 18 by any appropriate means, such as by passing fasteners, such as bolts, through apertures 44 in the pair of brackets 40, 42 and into apertures 76 located in the cross channel 18. It will be understood that the pair of brackets 40, 42 and cross channel 18 may be arranged so that the ball coupler 30 may be vertically adjustable with respect to the cross channel 18. Such an arrangement may allow for the fifth wheel hitch 10 to be attached to a wide variety of common gooseneck hitches. It will also be understood that bolting the ball coupler 30 to the cross channel 18 may also add strength to the cross channel 18 and the fifth wheel hitch 10.

The ball coupler 30 may include the functionality of reducing excess play between the ball coupler 30 and the hitch ball 24. As shown in FIG. 2, the bracket 40 may include a threaded aperture 38. The threaded aperture 38 may be located adjacent to the chamber 22 of the ball coupler 30. The aperture 38 may be arranged to accommodate a fastener 74, such as a set screw, to remove excess free play between the ball coupler 30 and the hitch ball 24. For example, as a set screw is threaded into the aperture 38, a bottom portion of the set screw may move vertically downward, with respect to FIG. 2, and toward the top of the ball portion 32 of the hitch ball 24. As the sets crew moves vertically downward, it will eventually engage with the hitch ball 24. By applying sufficient torque to the set screw, the set screw may apply a sufficient force onto the hitch ball 24 thereby reducing or eliminating excess play between the hitch ball 24 and the ball coupler 30.

Such a reduction in play may provide for a more stable coupling, where relative movement between components of the trailer and towing vehicle may be reduced and the transfer of forces between the trailer and towing vehicle may be more direct. In addition to the set screw and threaded aperture 38 combination, the engagement of the locking pin 26 to the neck portion 34 of the hitch ball 24 also may reduce excessive play between the hitch ball 24 and the ball coupler 30. When the ball coupler 30 is spring-loaded, the force of the spring on the locking pin 26 may move the locking pin 26 into engagement with the neck portion 34 of the hitch ball 24 and thus reduce excess play between the hitch ball 24 and the ball coupler 30.

It will be understood that the arrangement of the fifth wheel hitch embodiments disclosed herein may promote the use of such embodiments with a wide variety of commercial gooseneck hitch balls. For example, the set screw, locking pin, or a combination of the set screw and locking pin may provide mechanisms for the chamber 22 of the fifth wheel hitch 10 to accommodate different size hitch balls. For example, the fifth wheel hitch 10 as disclosed herein may accommodate hitch balls having a variety of diameters, such as a diameter ranging from less than 1.5 inches to more than 2.5 inches.

As shown in FIG. 3, the fifth wheel hitch 10 may include a head pin 48. The head pin 48 may couple the saddle casting 14 to the adjustment plates 16. Fasteners 68, such as bolts, may be used in conjunction with the head pin 48 to securely attach the saddle casting 14 and the adjustment plates 16. The head pin 48 may be of any appropriate shape or size, such as a generally cylindrical shape. The head pin 48 may include a wall or plane 52 extending radially out from and around the head pin 48.

The saddle casting 14 may include a pair of chambers 50 separated by the wall 52 extending from the head pin 48 (FIG. 3). The chambers 50 may be defined by the wall 52 and the shell of the saddle casting 14. The saddle casting 14 may be arranged so that it may slide along the longitudinal length of the head pin 48. As the saddle casting 14 slides along the length of the head pin 48, the width of the chambers 50 may increase and decrease.

The fifth wheel hitch 10 may include at least one isolator or damper 46 (FIG. 3). The dampers 46 may be any appropriate shape or size. While shown with two dampers 46, the fifth wheel hitch 10 may include any appropriate number of dampers 46. The pair of dampers 46 may be positioned within the chambers 50 to fill the space between the wall 52 and the shell of the saddle casting 14. The dampers 46 may be arranged so that each is mounted on the head pin 48 and fills one of the chambers 50 (FIG. 3). Alternatively, the dampers 46 may be arranged so that each is positioned adjacent to the head pin 48 and fills one of the chambers 50. The dampers 46 may also be arranged so that each damper 46 may slide along the longitudinal length of the head pin 48.

The dampers 46 may be formed from urethane. However, it will be understood that dampers 46 may be formed from any appropriate material that may deform and absorb force. The dampers 46 may be arranged so as to dampen longitudinal impact loads transmitted through the fifth wheel hitch 10 to the towing vehicle. The saddle casting 14 may be arranged so that there may be a gap 54 located between the outside of the saddle casting 14 and the adjustment bracket 16 (FIG. 3). Such an arrangement may allow approximately an inch of dampened longitudinal travel in each direction along the head pin 48. The fifth wheel head 12 may move one inch laterally before the saddle casting 14 engages the adjustment plates 16.

The use of dampers 46 may reduce impact transmitted from the trailer to the towing vehicle, which may result in improvements in the ride of the towing vehicle and the comfort of the driver and passengers. The dampers 46 may be shaped and sized to reduce shock transferred from the trailer by approximately 25 percent.

The fifth wheel hitch 10 may also include wear strips 56. The wear strips 56 may be of any appropriate shape, size or material. The wear strips 56 may be positioned between the bed of the towing vehicle and the support legs 20 of the fifth wheel hitch 10 (FIG. 1). The wear strips 56 may be arranged to fit a variety of common beds. The placement of such wear strips 56 between the bed of the towing vehicle and the support legs 20 may prevent damage to both the bed and the support legs 20.

As shown in FIG. 1, each support legs 20 may include an aperture 58. The aperture 58 may be arranged to accommodate a pin (not shown) that may be passed through the aperture 58 in the support legs 20 and into a matching aperture (not shown) in the bed of the towing vehicle. Once the pins are passed through the apertures 58 in the support legs 20 and the apertures in the bed, the pins may resist rotational movement of the fifth wheel hitch 10 with respect to the bed of the towing vehicle. Such reduction or elimination of rotational or torsional movement allows for the use of sidewinder-style hitches. No tools are required to install and remove the pins from the apertures 58.

The pin may be used along with a rivet nut (not shown). Use of a rivet nut may allow for a hole to be drilled into the truck bed and the rivet nut inserted from the topside of the bed without the need to install any hardware from the bottom side of the vehicle. The pin may also be arranged to simply slide into the rivet nut when the hitch is in use and require no tools after initial installation.

Although the preferred embodiments of the invention have been illustrated in the accompanying drawings and described in the foregoing detailed description, it is to be understood that the invention is not to be limited to just the preferred embodiments disclosed, but that the invention described herein is capable of numerous rearrangements, modifications and substitutions without departing from the scope of the claims hereafter.

Having thus described the invention, we claim:

1. A fifth wheel hitch for use with a towing vehicle and a king pin of a towed vehicle, said fifth wheel hitch comprising:
    a pair of support legs capable of removable engagement with a load bed of the towing vehicle;
    a cross channel located generally between and connecting said pair of support legs, wherein said cross channel includes a coupler assembly capable of engagement with a gooseneck hitch;
    at least one adjustment plate secured to said cross channel;
    a saddle removably connected to said adjustment plates with a fastener, wherein said saddle is capable of sliding movement along the longitudinal length of said fastener; and
    a head connected to said saddle, wherein said head is capable of engagement with the king pin.

2. The fifth wheel hitch of claim 1, wherein said gooseneck hitch includes a hitch ball.

3. The fifth wheel hitch of claim 2, wherein said coupler assembly comprises:
    a chamber capable of housing said hitch ball;
    a locking pin capable of engagement with said hitch ball; and
    a handle capable of operating said coupler assembly.

4. The fifth wheel hitch of claim 3, wherein said coupler assembly secures said fifth wheel hitch to said hitch ball.

5. The fifth wheel hitch of claim 3, wherein said locking pin is capable of lateral movement to accommodate said hitch ball as it moves past said locking pin.

6. The fifth wheel hitch of claim 3, wherein said coupler assembly is capable of reducing movement between said coupler and said hitch ball.

7. The fifth wheel hitch of claim 3, wherein said coupler assembly is capable of accommodating hitch balls having a variety of diameters.

8. The fifth wheel hitch of claim 1, wherein said saddle includes at least one damper.

9. The fifth wheel hitch of claim 1, wherein said saddle is arranged to form a gap located between either side of said saddle and said adjustment plates.

10. The fifth wheel hitch of claim 1, wherein said cross channel houses at least one bracket capable of attachment to said coupler assembly.

11. The fifth wheel hitch of claim 10, wherein said bracket includes a threaded aperture located adjacent to said chamber of said coupler assembly.

12. The fifth wheel hitch of claim 1, wherein said plates are vertically adjustable with respect to said cross channel.

13. The fifth wheel hitch of claim 1, wherein said head is capable of lateral movement prior to said saddle engaging said adjustment plates.

14. A fifth wheel hitch for use with a towing vehicle and a king pin of a towed vehicle, said fifth wheel hitch comprising:
    a pair of support legs capable of engagement with the towing vehicle;
    a cross channel located generally between and connecting said pair of support legs, wherein said cross channel includes a coupler assembly capable of engagement with a hitch ball;
    at least one adjustment plate secured to said cross channel;
    a saddle removably connected to said adjustment plates with a fastener, wherein said saddle includes at least one damper located around said fastener whereby said damper is capable of longitudinal movement along said fastener; and
    a head connected to said saddle, wherein said head is capable of engagement with the king pin.

15. The fifth wheel hitch of claim 14, wherein said support legs include at least one wear strip located between said support legs and said towing vehicle.

16. The fifth wheel hitch of claim 15, wherein said support legs are capable of secured attachment to said towing vehicle.

17. The fifth wheel hitch of claim 14, wherein said saddle includes at least one chamber that may house said damper.

18. The fifth wheel hitch of claim 14, wherein said damper dampens impact forces transferred from the towed vehicle to the towing vehicle.

* * * * *